J. WEBSTER & J. H. WEBSTER.
Differential Gearings for Hoisting Apparatus, &c.
No. 137,267. Patented March 25, 1873.
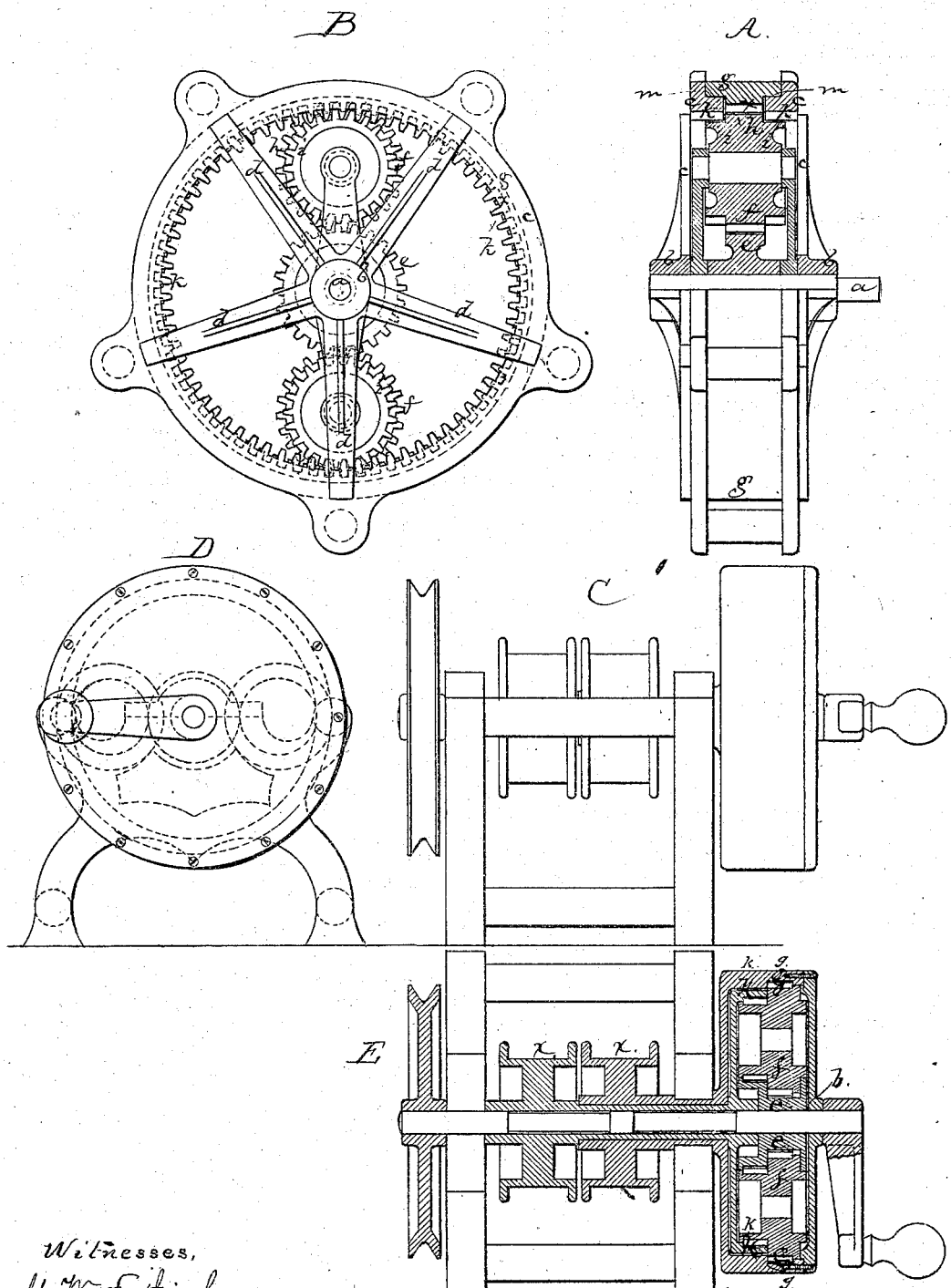

UNITED STATES PATENT OFFICE.

JUSTUS WEBSTER AND JOHN H. WEBSTER, OF BOSTON, ASSIGNORS TO THEMSELVES AND LORENZO D. HAWKINS, OF STONEHAM, MASS.

IMPROVEMENT IN DIFFERENTIAL GEARINGS FOR HOISTING APPARATUS, &c.

Specification forming part of Letters Patent No. 137,267, dated March 25, 1873.

*To all whom it may concern:*

Be it known that we, JUSTUS WEBSTER and JOHN H. WEBSTER, both of Boston, in the county of Suffolk and State of Massachusetts, have invented an Improvement in Differential Gearing for Hoisting Apparatus, &c.; and we do hereby declare that the following, taken in connection with the drawing which accompanies and forms part of this specification, is a description of our invention sufficient to enable those skilled in the art to practice it.

Our invention relates particularly to that class of hoisting-gear employed for elevators, or for elevator-pulleys, the invention being particularly designed for raising heavy weights by an outlay of but moderate power, and without heavy gearing; and the invention consists in a novel arrangement of gears or gear-pinions within an internal gear-wheel, a center pinion-wheel on the driving-shaft meshing into and rotating one or more loose pinion-wheels, the teeth of which, opposite to the center pinion, mesh into teeth on the interior surface of an outer or gear-encompassing ring or pulley, the driving-pinion having one set of teeth, which mesh into corresponding teeth of the auxiliary pinions, and each of the latter pinions having upon one or upon each side of the main teeth, another set of teeth, the side pinion formed by such teeth being of less diameter, and of course less number of teeth, the pinion of lesser diameter meshing into one set of teeth on the inner surface of the stationary gearing-frame, (or into the internal teeth of a ring rotating at the side of the first ring,) and the large pinion meshing into a set of internal teeth, the ring or part of a ring embracing which will, of course, be of correspondingly larger diameter.

This encompassing gear-ring may itself be the rope-winding drum, or it may have a hub uniting it to the rope-winding drum, the gear-ring being, in either case, made rotative.

If each pinion immediately driven by the center pinion and meshing into the gear-ring had but one set of teeth, then, of course, the ring would not be rotated; but the pinions would simply travel upon the ring; but by making the pinion with one or more additional sets of teeth of less diameter, and, of course, less number of teeth than the driven set, and the ring-frame with an internal gear of correspondingly smaller diameter and less number of teeth, the ring is rotated by the pinions as they travel around within it, and the rope wound upon or unwound from its periphery or the periphery of the drum on the hub of the ring.

The drawing represents a wheel or pulley frame and pulley embodying our invention.

A shows the wheel in diametric section and sectional elevation. B is an elevation of it.

$a$ denotes the driving-shaft rotating in stationary hubs or bearings $b$ at the opposite sides of a frame, which frame is composed of said hubs or boxes, rims or heads $c$, and radial arms or spokes $d$, which connect the rims and hubs, the rims being placed at suitable distance apart to receive the pinion mechanism. The shaft $a$ carries a driving gear or pinion, $e$, the main teeth of which mesh into the teeth of two pinions, $f$, on diametrically opposite sides of the driving-pinion $e$. The pinions $e f$ are inclosed within the frame, and they not only are rotated by the driving-pinion $e$, but revolve around said driving-pinion, their outer teeth traveling upon the internal gear-teeth $x$ of an encompassing wheel or ring, $g$, the pinion-teeth $h$ simply riding upon the ring-teeth $e$. Each gear-pinion, however, is made with an additional set of teeth, $i$, on one or each side of it, there being a less number of teeth $i$ than of teeth $h$, and the side pinions being, therefore, smaller in diameter than the main pinion $e$. Each side pinion thus made meshes into internal gear-teeth $k$ made on the inner side of the adjacent rim $c$, the circle or ring of teeth $k$ being, of course, of correspondingly smaller diameter than the ring $g$, for the engagement of the teeth $i$, and having, therefore, a less number of teeth than the ring $g$. In consequence of this construction, the rotation of the driving-pinion, by rotating the pinions $f f$, carries them around within the gear-ring, and also effects the rotative movement of the said gear-ring, the rim $c$ being stationary. The outer surface of the rotated gear-ring is made cylindrical to receive the rope, the flanges $l$ of the rim serving as guides for the drum-ring and for the rope, and the ring rotates upon shoulders $m$ of the rim $c$, and friction-rollers may be interposed between the shoulders m and the drum-ring to lessen friction. Each pinion f has an axle or gudgeon, n, journaled in the ends of radial arms o, which arms are hung and rotate freely upon the driving-shaft.

To prevent back movement of the drum, friction-chocks may be used, or a suitable retaining-pawl mechanism.

The arrangement of the gearing is very simple, but makes an enduring and effective organization, the respective gears being light; but the desired result for heavy work being attained by the differential construction of the pinions driven by the main pinion, and the corresponding differential construction of the internally-toothed gear-rings driven thereby.

At C, D, and E is shown an arrangement of the compound gearing in connection with two winding-drums, x x, the construction and operation of the gears and drums being apparent from the description of the other views.

We claim—

The combination of the driving-pinion e, differential pinions f, and the internal gear-rings g k, with their differential gear-teeth.

Executed this 10th day of January, A. D. 1872.

JUSTUS WEBSTER.
JOHN H. WEBSTER.

Witnesses:
FRANCIS GOULD,
M. W. FROTHINGHAM.